United States Patent Office 2,861,915
Patented Nov. 25, 1958

2,861,915
DINITROPHENYL 4-PENTENOATES

Roderick C. Cary, Bristol, Pa., assignor to Rohm & Haas Company, Philadelphia, Pa., a corporation of Delaware No Drawing. Application June 1, 1956
Serial No. 588,597

2 Claims. (Cl. 167—30)

This invention concerns dinitrophenyl 4-pentenoates having as a ring substituent in addition to the two nitro groups a hydrocarbon group of four to ten carbon atoms and preferably five to nine carbon atoms. These nitrophenyl esters exhibit marked fungicidal, miticidal, and insecticidal action with a relatively low degree of phytotoxicity compared to other nitrophenolic derivatives.

It has been proposed by Hester and Craig to use capryldinitrophenyl crotonate as a pesticidal agent on plants. This compound has been found quite effective for controlling mites and various fungi on plants without serious phytotoxicity if the compound is carefully manufactured and applied at low concentrations. The success of this compound in these applications appears to depend upon a balance of factors based on the size, nature, and position of the alkyl group and upon the particular acid residue used. Effectiveness changes rather abruptly with deviations in these factors.

I have discovered a new class of phenyl esters which comprises remarkably effective pesticides for specific uses. These new esters are not highly critical as to exact form, size, and position of the hydrocarbon substituent or limitation thereof to a particular alkyl substitutent, provided it contains at least four carbons, or even to an alkyl group. It now becomes possible to use any hydrocarbon substituted dinitrophenol provided there are at least four carbon atoms in the hydrocarbon substituent and there are not over about ten carbon atoms in this group. It is preferred that there be five to nine carbon atoms in this group.

These new compounds are esters of 4-pentenoic acid and a dinitrophenol having a hydrocarbon substituent of indicated size. This hydrocarbon substituent may be alkyl as in butyl, tert-butyl, amyl, isoamyl, tert-amyl, hexyl, 2-ethylbutyl, heptyl, octyl, 2-octyl, nonyl, 3,5,5-trimethlyhexyl, or decyl, cycloalkyl as in cyclohexyl, methylcyclohexyl, or trimethylcyclohexyl, or aryl as in phenyl or methylphenyl, or aralkyl as in benzyl or methylbenzyl. This group is on a ring carbon not occupied by a nitro group. Commonly the position is ortho or para to the phenolic ester grouping and one of the unexpected discoveries is that the effectiveness and safety of the new compounds is less dependent on position and on form and size, within the stated limits than in the case of previously known compounds. I theorize that there is a peculiar balance in the relative ease with which these esters are hydrolyzed. This balance depends upon the particular acid residue present, upon the presence of at least three ring substituents including two nitro groups and a hydrocarbon group, and upon the general size of the latter group.

These compounds may be summarized by the formula

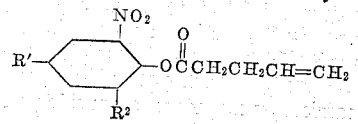

where one of the groups R' and R² is a nitro group and the other is a member of the class consisting of alkyl groups of four to ten carbon atoms, cyclohexyl, phenyl, and benzyl groups.

The preparation of dinitro-derivatives of hydrocarbon-substituted phenols is known. In most cases the phenols can be reacted in acetic acid with nitric acid at moderate to low temperatures. In a few cases the phenol is more effectively nitrated by first reacting with sulfuric acid and then with nitric acid or a soluble salt of nitric acid. When the dinitro-hydrocarbon substituted phenol is solid, it can be purified by crystallization.

The phenols may now be reacted with an alkali metal to form the alkali metal phenate, which is in turn reacted with a 4-pentenoyl halide, either bromide or chloride being satisfactory. The phenates can be formed, for example, by reacting the phenol in solution as in alcohol at about room temperature with at least an equivalent amount of an alkaline reagent such as an aqueous 25% sodium hydroxide solution. Or, the phenol may be slowly added to a warm (30° to 60° C.) aqueous 25% to 50% sodium hydroxide solution in excess or an equivalent strong alkali in solution.

The phenate is now reacted with the 4-pentenoyl halide in an inert organic solvent, such as a low boiling naphtha, at 10° to 80° C. or more. The solvent solution of product is treated with water. The product is also desirably washed with an alkaline solution and the solvent is driven off by heating to yield a residue which is technical hydrocarbon-substituted dinitrophenyl 4-pentenoate.

An alternate preparation of the desired hydrocarbon-substituted dinitrophenyl 4-pentenoate utilizes the hydrocarbon-substituted dinitrophenol treated with a tertiary amine, such as triethanolamine, benzyldimethylamine, pyridine, triethylamine, or triamylamine, or the like in the presence of an inert organic solvent such as naphtha or toluene. This mixture is treated at 10° to 50° C. with 4-pentenoyl chloride or bromide with control of temperature between 10° and 160° C., and the reaction is completed between 20° and 100° C. The amine hydrohalide is washed out with water and the product worked up as desired.

The 4-pentenoyl halides can be made from the esters of 4-pentenoic acid, which are available as by-products from the preparation of acrylic esters from acetylene. A typical preparation follows.

An aqueous 25% sodium hydroxide solution (450 parts) is taken and 256 parts of ethyl 4-pentenoate slowly added thereto with the temperature of the reaction mixture about 100° C. The resulting solution is acidified with aqueous 25% sulfuric acid to a pH of 4. An oil forms. It is taken up in benzene and separated. The extract is dried over sodium sulfate and the solvent is evaporated to give an orange oil amounting to 165 parts. This may be distilled at 99° C./23 mm. to 105° C./30 mm. to give 4-pentenoic acid in a yield of about 80%.

This acid is slowly added to thionyl chloride in slight stoichiometric excess with a trace of sulfuric acid as catalyst at 5° to 10° C. The mixture is heated to about 80° C. to drive off sulfur dioxide. It is then fractionally distilled. The desired 4-pentenoyl chloride distills at 120°–125° C. or at 30° C./15 mm.

Further details are presented in the following examples which are presented for purposes of illustration and are not to be construed as limitations. Parts are by weight unless otherwise stated.

*Example 1*

A mixture of 150 parts of octane and 53.2 parts of 2,6-dinitro-4-cyclohexylphenol was cooled to 14° C. and 41 parts of benzyldimethylamine was slowly added while the temperature of the reaction mixture was kept at 10° to 14° C. by external cooling. To this mixture, there was slowly added 29.6 parts of 4-pentenoyl chloride with the temperature rising from 10° to 21° C. The reaction mixture was stirred for two hours with the temperature at 21° to about 30° C. and then stirred for two hours at 60° to 80° C. The resulting slurry was cooled to about 20° C. and poured into 2,000 parts of an ice-water mixture. The resulting mixture was extracted with 1200 parts of benzene. The benzene extract was washed four times with water, dried over sodium sulfate, and heated under reduced pressure to remove solvent. The residue solidified when cooled. It was twice recrystallized from naphtha to give a pale yellow solid melting at 74°–75° C. and corresponding in composition to 2,6-dinitro-4-cyclohexylphenyl 4-pentenoate. The product has a saponification number of 324 (theory 322).

*Example 2*

A mixture of 53.2 parts of 2,4-dinitro-6-cyclohexylphenol and 150 parts of naphtha at about 15° C. was treated with 40.7 parts of benzyldimethylamine in portions. There was then added with stirring 29.6 parts of 4-pentenoyl chloride with the temperature changing from 10° to 30° C. As the mixture became somewhat thick, there was added 40 parts of naphtha and stirring was continued at 20°–30° C. for a half hour and at 60°–80° C. for two hours. The mixture was cooled and poured into 2,000 parts of ice-water. The organic layer was taken up in benzene. The benzene layer was washed with water and stripped by heating to 100° C./20 mm. to leave a solid residue. This was recrystallized from ethanol and then from petroleum ether to give a 43% yield of solid, melting at 81.5°–82° C. and analyzing correctly for 2,4-dinitro-6-cyclohexylphenyl 4-pentenoate.

*Example 3*

A solution was prepared from 226 parts of dinitromethylheptylphenol in which 2,4-dinitro-6-methylheptylphenol was in major proportion and 2,6-dinitro-4-methylheptylphenol in minor proportion and 160 parts of octane. To this solution was slowly added with stirring 113 parts of benzyldimethylamine with the temperature of the mixture at 25°–30° C. to form a slurry. To this was slowly added 95 parts of 4-pentenoyl chloride. The resulting mixture was heated at 60° to 80° C. for 90 minutes. It was washed four times with 190 part portions of water. The organic mixture was then heated under reduced pressure to drive off the solvent and stripped to 100° C. at 20 mm. The product, collected as a red oil, amounted to 287 parts and was dinitromethylheptylphenyl 4-pentenoate, chiefly the 2,4-dinitro-6-methylheptylphenyl 4-pentenoate.

The above procedure was repeated with a starting phenol which was practically pure 2,4-dinitro-6-methylheptylphenol. The product corresponded in composition to 2,4-dinitro-6-methylheptylphenyl 4-pentenoate. It was likewise an oil.

*Example 4*

To a solution of 102 parts of 2,6-dinitro-4-(1,1,3,3-tetramethylbutyl)phenol in 70 parts of octane was added 52 parts of benzyldimethylamine with the temperature of the mixture at 25° to 30° C. To the thick slurry which formed was added 130 parts of octane. The mixture was stirred while 43.2 parts of 4-pentenoyl chloride was added. The resulting mixture was heated to 60°–70° C. and stirred for eight hours. It was then washed four times with 250 part portions of water. The washed solution was heated under reduced pressure up to 100° C. at 20 mm. to give 117 parts of red oil. The oil was dissolved in about 160 parts of octane and treated with charcoal and then heated to 120° C./0.4 mm. to yield 92 parts of red oil. Since upon analysis it was found that there was a fair amount of the free phenol still present, 76 parts of this oil was treated with 9.3 parts of benzyldimethylamine and 150 parts of octane, followed by 7.7 parts of 4-pentenoyl chloride. This mixture was heated and stirred at about 70° C. for six hours. It was then washed four times with water, concentrated by heating under reduced pressure, and stripping at 120° C./0.5 mm. to yield 71 parts of a product corresponding in composition to 2,6-dinitro-4-(1,1,3,3-tetramethylbutyl)phenyl 4-pentenoate.

The same procedure applied to a 2,6-dinitro-4-nonylphenol in which the nonyl group is of branched chain structure from a nonene, a propylene trimer yields a product which is likewise an oil and corresponds in composition to 2,6-dinitro-4-nonylphenyl 4-pentenoate.

The same procedure applied to a dinitrodecylphenol in which the decyl group is likewise derived from a cut of olefins yields dinitrodecylphenyl 4-pentenoate. The product is chiefly the 2,6-dinitro-4-decyl isomer, but there is also 2,4-dinitro-6-decyl isomer present.

*Example 5*

A solution was prepared from 30 parts of 2,6-dinitro-4-tert-butylphenol and 80 parts of naphtha and cooled to 8° C. To it was added 23.7 parts of benzyldimethylamine in small portions with stirring. A gummy, red mass formed to which was slowly added 4-pentenoyl chloride in an amount of 20.2 parts. Stirring was continued for two hours at 15° C. and then two hours at 40°–50° C. The reaction mixture was poured into 1,000 parts of ice water and extracted with about 600 parts of ethylene dichloride. The organic layer was taken, washed with water, dried over sodium sulfate, and concentrated by heating under reduced pressure to 100° C. at 20 mm. to give 32 parts of an amber oil which corresponds in composition to 2,6-dinitro-4-tert-butylphenyl 4-pentenoate.

*Example 6*

A slurry was made from 30 parts of 2,6-dinitro-4-tert-amylphenol and 70 parts of octane and cooled to 5° C. Thereto was added 24.3 parts of benzyldimethylamine. A gummy red mass resulted which changed to an orange solid. With this there was slowly mixed 20.2 parts of 4-pentenoyl chloride with the temperature at 5°–10° C. The reaction mixture was then stirred at about 10° C. for an hour and at 50° C. for two hours and poured into a liter of ice water. The resulting oil layer was taken up in ethylene dichloride and the organic layer was separated. It was dried over sodium sulfate and heated under reduced pressure to 100° C./20 mm. to give 33 parts of an oil, which corresponds in composition to 2,6-dinitro-4-tert-amylphenyl 4-pentenoate.

In a similar way 2,6-dinitrophenol was converted to 2,6-dinitrophenyl 4-pentenoate, an oil. As it was found exceedingly phytotoxic to typical plants, further details of this material are not given.

*Example 7*

There were mixed 65 parts of 2,4-dinitro-6-phenylphenol and 200 parts of octane. The mixture was cooled to about 7° C. and treated with 40.5 parts of benzyldimethylamine in portions. Then 34.2 parts of 4-pentenoyl chloride was slowly added with the temperature of the mixture held at 20°–22° C. A short time later the mixture solidified. It was heated to 60° C. and stirred for two hours with the temperature at 60° to 80° C. It was then cooled and poured into 2,000 parts of water. A solid formed and was filtered off. It was recrystallized from ethanol with charcoaling, then from petroleum ether, and again from ethanol to give 46 parts of a solid melting at 55°–57° C. and corresponding in composition to 2,4-dinitro-6-phenylphenyl 4-pentenoate.

The dinitrophenyl 4-pentenoates having a ring substituent in the form of a hydrocarbon group of four to ten carbon atoms, such as alkyl, cycloalkyl, or phenyl, are effective as miticidal agents and fungicidal agents against obligate parasites. For these uses they need be diluted with inert carriers or extenders to provide pesticidal compositions. They may be applied, for example, in the form of dusts or in sprays.

Dusts usually contain from 1% to 10% of one or more of the compounds of this invention. This may be the sole toxicant or the dust may contain one or more other kinds of pesticides. Dusts may be prepared by mixing a compound of this invention or a solution thereof in a volatile inert solvent with one or more finely particled solid carriers such as a clay, diatomaceous earth, pyrophyllite, talc, or walnut shell flour, and mixtures of solids. A dispersing agent such as a sodium lignin sulfonate or condensed formaldehyde-naphthalene sodium sulfonate may be used.

Wettable powders may be similarly prepared except that a larger proportion of active agent is used and a wetting agent is incorporated. Usually a wettable powder will contain 20 to 25% of at least one hydrocarbon-substituted dinitrophenyl 4-pentenoate, 1% to 2% of a dispersing agent, 1% to 3% of a wetting agent, such as an alkylphenoxypolyethoxyethanol, a sodium alkylbenzenesulfonate, or sodium lauryl sulfate, and the balance one or more finely particled solids. The wettable powders are ordinarily extended with water and applied in sprays.

The compounds may also be used in solution. Thus, they may be dissolved in a water-miscible solvent, such as acetone and the solution extended with water. More generally an emulsifiable concentrate may be prepared by dissolving a compound in a solvent such as toluene, xylene, or an aromatic naphtha and including a solvent-soluble emulsifier. Typical emulsifiable concentrates are prepared from 20% to 25% of one of the compounds of this invention 2% to 5% of a wetting agent such as an octylphenoxypolyethoxyethanol or a comparable polyethoxyethanol wetting agent and calcium dodecylbenzenesulfonate or calcium dioctyl sulfosuccinate.

Some illustrative formulations are: 2,4-dinitro-6-cyclohexylphenyl 4-pentenoate five parts, formaldehyde-naphthalene sodium sulfonate two parts, a fine Georgia clay 85 parts, and fuller's earth eight parts; 2,4-dinitro-6-(2-octyl)phenyl 4-pentenoate 25 parts, formaldehyde-naphthalene sodium sulfonate one part, octylphenoxypolyethoxyethanol three parts, magnesium carbonate five parts, and clay 66 parts; 2,6-dinitro-4-tert-nonylphenyl 4-pentenoate 24 parts, xylene 71 parts, an emulsifier from polyglycerol, oleic acid, and a small amount of phthalic anhydride three parts, and nonylphenoxypolyethoxyethanol two parts.

A wettable powder or solution is applied in sprays containing from about one-tenth pound to two pounds of a compound of this invention per 100 gallons of water. One of the advantages of the particular compounds of this invention is that they are effective against fungi on plants at very low application rates and act against mites at somewhat higher rates, which, are however, still relatively low. They should not be applied at high rates as under some conditions and on some plants there may then be evidence of some phytotoxicity. For example, a good many of the compounds produce undesirable effects on tomato seedlings when used at 1% concentrations in sprays.

Under usual conditions application at the rate of one to two pounds per acre or less on vegetables appears quite safe. Rate of coverage can be up to six to eight pounds per acre on fruit trees to obtain very thorough coverage and under the conditions which are encountered when fruit trees are usually sprayed this is not beyond the limits of safety. The materials should not be applied, however, when temperatures are above about 90° F.

The hydrocarbon-substituted dinitrophenyl 4-pentenoates find especial utility in combatting mildews on fruit trees, vegetables, field crops, ornamentals, and flowers. Tests were made with many of the compounds of this invention for the control of powdery mildew on bean plants, the primary leaves of which were about three-fourths matured. Plants were sprayed with aqueous dispersions which were prepared by extending an acetone solution of the compound under test in a volume of water to give the equivalent of 1/8, 1/16, 1/32, and 1/64 pound of compound per 100 gallons of spray. The sprayed plants were allowed to dry and were then inoculated with a suspension of fungus spores of 25,000 spores per ml. The plants were then kept in a greenhouse for 14 days, when the number of lesions was determined. Excellent control of mildew was found at 1/8 and 1/16 pound per 100 gallons with the 4-pentenoate esters of 2,6-dinitro-4-tert-octylphenol, 2,4-dinitro-6-(2-octyl)phenol, 2,6-dinitro-4-tert-butylphenol, 2,6-dinitro-4-tert-amylphenol, 2,4-dinitro-6-cyclohexylphenol, 2,4-dinitro-6-phenylphenol, and mixed dinitromethylheptylphenols. Results with these compounds was very good to good at 1/32 and 1/64 pound per 100 gallons. The ester with the tert-butyl group was the least efficient, but without injury. Results with 2,6-dinitro-4-cyclohexylphenyl 4-pentenoate was excellent at 1/8 pound per 100 gallons and very good at 1/16, 1/32 or 1/64 pound per 100 gallons. There was no evidence of injury in any of these tests.

In the same set of tests 2,4-dinitrophenyl 4-pentenoate was studied. It was not effective and gave severe injury at all dilutions, the plants being dead in the test at 1/8 pound per 100 gallons.

Tests were made for the control of mites (*Tetranychus bimaculatus*) on bean plants. Counts were made 24 hours after infested plants were sprayed. Kills of 100% were found for 2,6-dinitro-4-tert-octylphenyl 4-pentenoate at a dilution of 1/1600, 89% at 1/3200, and 77% at 1/6400. Kills of 100% were obtained with 2,4-dinitro-6-phenylphenyl 4-pentenoate at 1/1600 and 1/3200 and of 95% at 1/6400. Kills of 100% were obtained at 1/6400 or at greater concentrations with 2,6-dinitro-4-tert-butylphenyl, 2,6-dinitro-4-tert-amylphenyl, 2,4-dinitro-6-(2-octyl)phenyl, and 2,4-dinitro-6-cyclohexylphenyl 4-pentenoates.

These compounds are peculiarly active against various mildews. Specific organisms against which one or more of these compounds may be effectively applied include *Podosphaera leucotricha* found on apple, pear, and quince; *Podosphaera oxyacanthae* prevalent in the eastern states on apple, apricot, cherry, peach, and pear; *Erysiphe graminis* occurring on cereal and grasses, such as barley, oats, rye, wheat, and lawn grasses; *Erysiphe cichoracearum* on cucurbits, endive, lettuce, chrysanthemum, cosmos, dahlia, delphinium, hollyhock and phlox; *Microsphaera euonymi* on euonymus; *Uncinula necator* on grapes; *Sphaerotheca humuli* found on hops, blackberry, dewberry, raspberry, strawberry, roses, etc.; *Erysiphe polygoni* found on such vegetables as beans, peas, radish, and turnips and such flowers as asters, columbine, dahlia, delphinium, hydrangea, and peony; *Microsphaera alni* occurring on blueberry, cranberry, pecan, hazelnut, catalpha, dogwood, elm, holly, magnolia, privet, lilac, alder, or viburnum; *Phyllactinia corylea* on blackberry, currant, gooseberry, or raspberry, ash, barberry, crabapple, dogwood, or hazelnut; *Oidium tabaci* of tobacco, or *Oidium tingitaninum* of citrus.

The dilution of the compound and the rate of application for optimum results will vary with the particular plant and plant disease. In general one-eighth pound to one-quarter pound per 100 gallons of an ester will be used on fruit and nut trees, one-tenth pound to a quarter pound per 100 gallons on cucurbits and flower plants, and one-eighth to one pound on nursery stock. The esters serve both as protectants and eradicants.

An interesting property of the compounds of this invention lies in the fact that they exhibit bactericidal action. Against *Salmonella typhosa* they have a phenol coefficient of over one, the 2,4-dinitro-6-caprylphenyl 4-pentenoate giving a phenol coefficient of 1.7. In contrast the corresponding crotonate has a value, if any, below one. Against *Micrococcus pyogenes* var. *aureus* 2,4-dinitro-6- caprylphenyl 4-pentenoate gives a phenol coefficient of 2.3.

I claim:
1. The compound

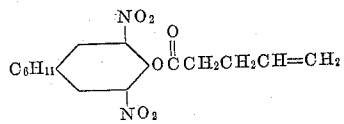

where $C_6H_{11}$ is a cyclohexyl group.

2. A process for controlling mildews on plants which comprises applying to mildew-infested plants an aqueous spray containing a mildew-controlling concentration from about 0.1 pound to two pounds per 100 gallons of a compound of claim 1.

References Cited in the file of this patent

UNITED STATES PATENTS 2,526,660   Hester et al. _____ Oct. 24, 1950

FOREIGN PATENTS 1,025,153   France _____ Jan. 21, 1953